United States Patent [19]

Kimoto et al.

[11] Patent Number: 4,554,557

[45] Date of Patent: Nov. 19, 1985

[54] THERMOMAGNETIC PRINTER

[75] Inventors: Toshifumi Kimoto; Hidemasa Todoh; Teruhiko Itami; Koichi Saitoh, all of Ebina, Japan

[73] Assignee: Fuji Xerox Co., Ltd., Tokyo, Japan

[21] Appl. No.: 725,518

[22] Filed: Apr. 22, 1985

Related U.S. Application Data

[63] Continuation of Ser. No. 482,612, Apr. 6, 1983, abandoned.

[30] Foreign Application Priority Data

Apr. 8, 1982 [JP] Japan ................................. 57-58499

[51] Int. Cl.⁴ ........................................... G01D 15/06
[52] U.S. Cl. ................................... 346/74.4; 346/74.5
[58] Field of Search ............. 219/216; 346/74.4, 74.2, 346/74.5; 355/3 DD, 16; 360/59

[56] References Cited

U.S. PATENT DOCUMENTS 3,521,294 7/1970 Treves .................................. 360/59
3,693,183 9/1972 Lemke ................................ 346/74.4
3,778,145 12/1973 McClure ........................ 346/74.4 X
3,935,578 1/1976 Condon et al. .................... 346/74.4
3,995,278 11/1976 Young ............................... 346/74.4
4,138,685 2/1979 Kellerman ........................ 360/59 X
4,314,257 2/1982 Tokunaga et al. ................ 346/74.4
4,427,987 1/1984 Kikuchi ............................. 346/74.4

FOREIGN PATENT DOCUMENTS 38-71507 12/1963 Japan .

*Primary Examiner*—Ulysses Weldon
*Attorney, Agent, or Firm*—Spensley Horn Jubas & Lubitz

[57] ABSTRACT

A thermomagnetic printer includes a recording unit for storing a latent image in which there are provided a magnetic recording layer providing thermomagnetic effect when placed in magnetic field with temperature graduation on one side of a photoconductive layer and a transparent electrically conductive layer on the other side.

When storing a latent image in the magnetic recording layer, light which emits corresponding to the image to be reproduced on a paper is irradiated onto the photoconductive layer through the transparent electrically conductive layer while applying magnetic field to the magnetic recording layer and supplying electricity between the magnetic recording layer and the electrically conductive layer, whereby irradiated part of the photoconductive layer and the corresponding part of the magnetic recording layer are heated by Joule heat effect and the latter is magnetized by the thermomagnetic effect. By repeating the above operation in accordance with the image information, the latent image is formed in the magnetic recording layer.

8 Claims, 10 Drawing Figures

THERMOMAGNETIC PRINTER

This is a continuation of application Ser. No. 482,612, filed Apr. 6, 1983, now abandoned.

BACKGROUND OF THE INVENTION

The present invention relates to a printer which utilizes thermomagnetic effect in forming a latent image on a magnetic material in which light is used to heat the magnetic material.

In a conventional magnetic printer, image is reproduced on a paper by the steps of forming a latent image on a magnetic recording medium in an imagewisely magnetized state, developing the image with magnetic toner of macromolecular resin containing fine magnetic particles transferring the developed image onto a receiving paper by electrostatic or magnetic method and fixing the image by heat or pressure.

To form the latent image on the medium in such a conventional printer, a magnetic head having recording tracks with adequate gaps is scanned over the medium in two-dimensional directions.

In such printer, it is necessary to maintain scanning conditions such as the interval between scanning lines and the scanning speed of the magnetic head constant, which requires extremely precise driving and controlling mechanisms. Particularly when a plurality of operational modes are employed in which the head is operated at a high speed to shorten the scanning time and the development and the transfer of image are carried out at a low speed, the conventional printer has such a disadvantage that the mechanisms are complicated in their construction.

To eliminate the above disadvantage it has been proposed a magnetic printer with a multi-magnetic head array. This printer employs a multi-magnetic head array in which magnetic recording tracks are arranged corresponding to every picture element rows over the entire width of the image. In order to satisfy the preferable resolution of the image to be reproduced, fine recording tracks, each of which has a width less than approx. 100 μm and a track interval of approx. 100 μm must be provided.

However, it is difficult to provide such fine tracks with coil windings corresponding to the respective tracks. Further, there occurs a problem of electromagnetic interference between the adjacent tracks and accordingly it is difficult to perform the reproduction of image with a desired resolution.

On the other hand, it has been proposed a thermomagnetic printer which utilizes thermomagnetic effect. This printer employs a thermal magnetic recording medium whose magnetic properties are affected by the influence of temperature. This recording medium magnetically stores an image by applying a heat to the desired portions of the medium which has been magnetized in advance so as to heat the portions at a temperature higher than Curie temperature, thereby selectively demagnetizing the portions or by applying magnetic flux from the exterior simultaneously upon application of the heat to the medium, thereby selectively magnetizing the heated portions. Such thermomagnetic printer employs as heat applying means a condensed laser light ray, flash light or a heating head array in which a number of resistor heating elements are arranged in one row or a plurality of rows.

However, such conventional thermomagnetic printer has disadvantages that its recording medium is likely to suffer thermal deformation since strong heat energy is applied thereto and that its heat applying means such as laser requires great electric energy.

SUMMARY OF THE INVENTION

Accordingly, it is an object of the present invention to provide a novel thermomagnetic printer which is free from the above disadvantages in conventional printers and which reduces the thermal deformation of its thermo magnetic recording medium, efficiently applies heat to the medium and can reproduces image of high quality with a high resolution at a high speed.

According to the present invention, the thermomagnetic printer performs the reproduction of an image by providing a magnetic recording medium on a photoconductive layer, energizing the medium through a portion of the photoconductive layer onto which light representing the image is irradiated, thereby selectively self-heating the medium of the part corresponding to the irradiated portion, and applying a magnetic field from the exterior to the medium, thereby forming a magnetic latent image.

BRIEF DESCRIPTION OF THE DRAWINGS

The above and other objects and advantages of the present invention will become clear from the following description with reference to the accompanying drawings, in which.

DESCRIPTION OF THE PREFERRED EMBODIMENTS

Figure 1:
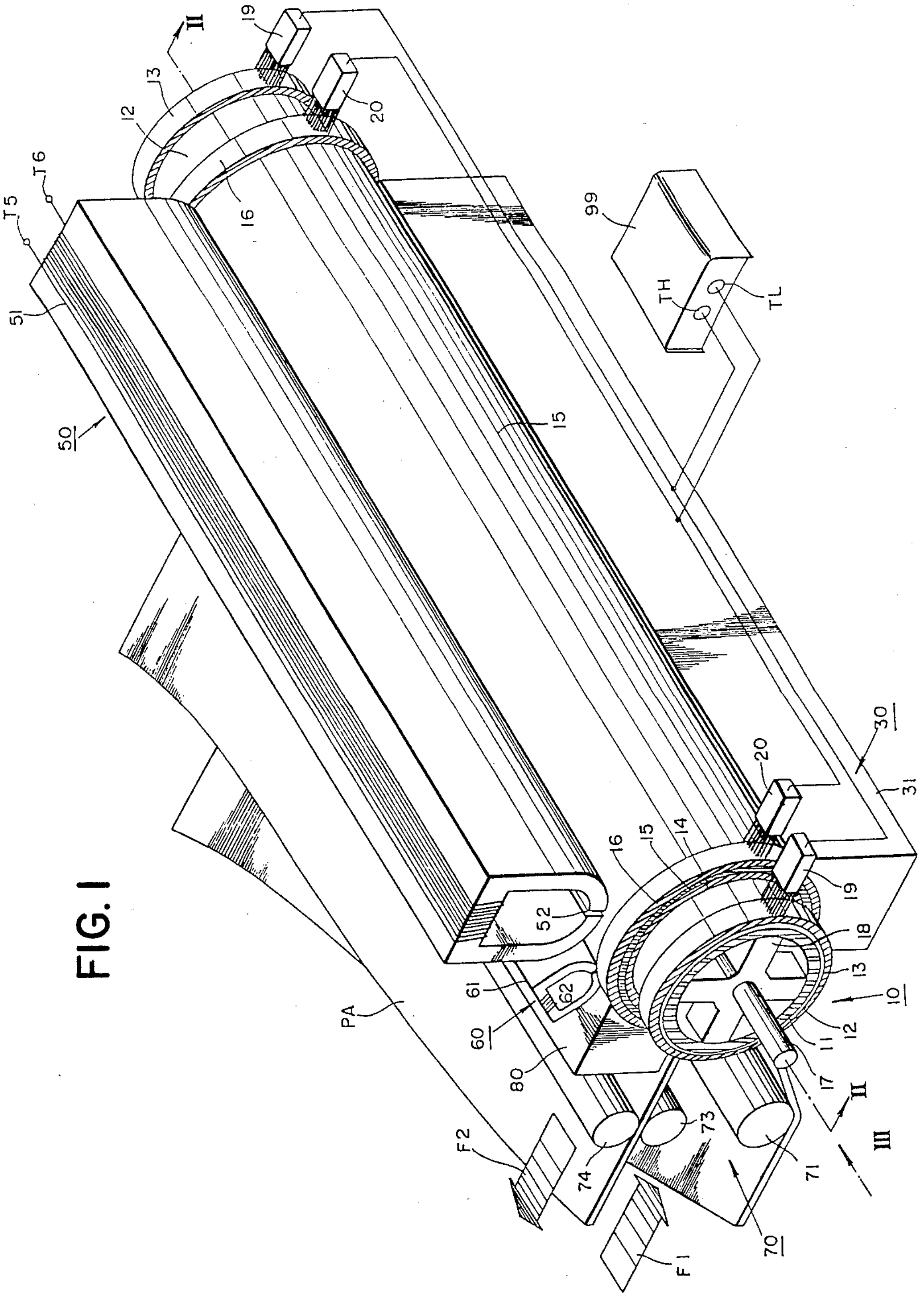
FIG. 1 is a perspective view showing a featuring portion of a thermomagnetic printer according to an embodiment of the present invention.
Figure 2:
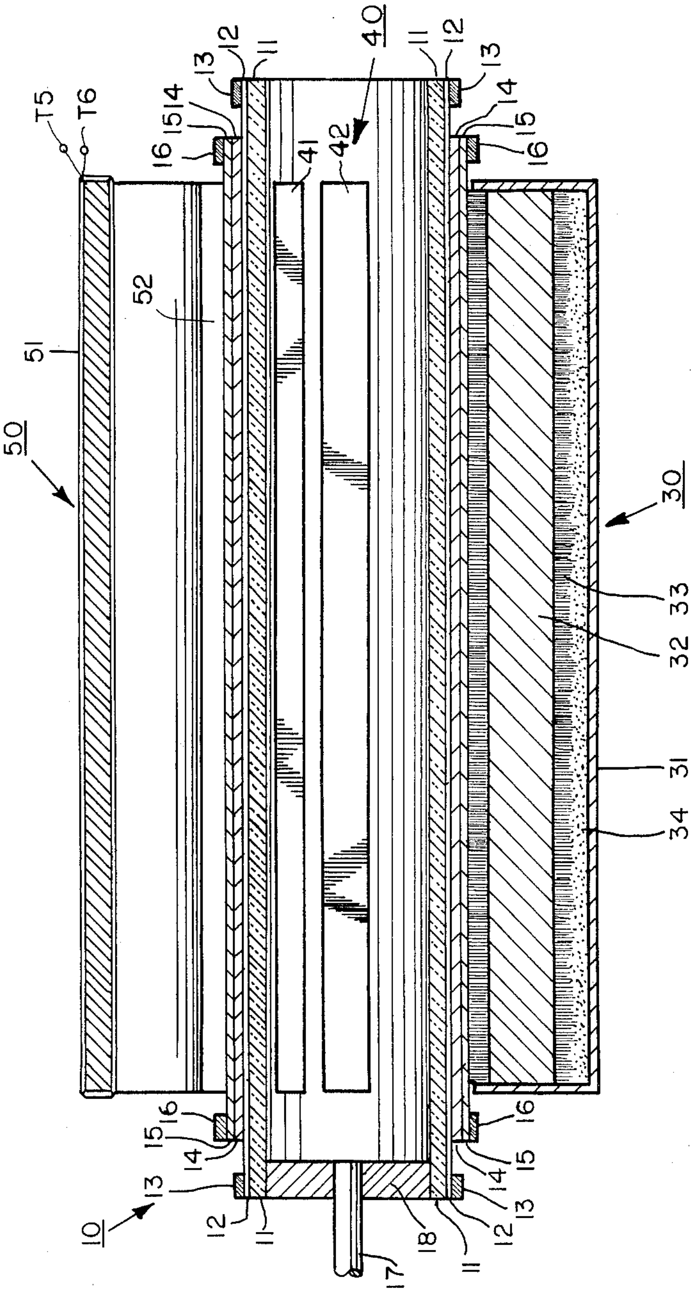
FIG. 2 is a sectional view taken along the line II—II in FIG. 1.
Figure 3:
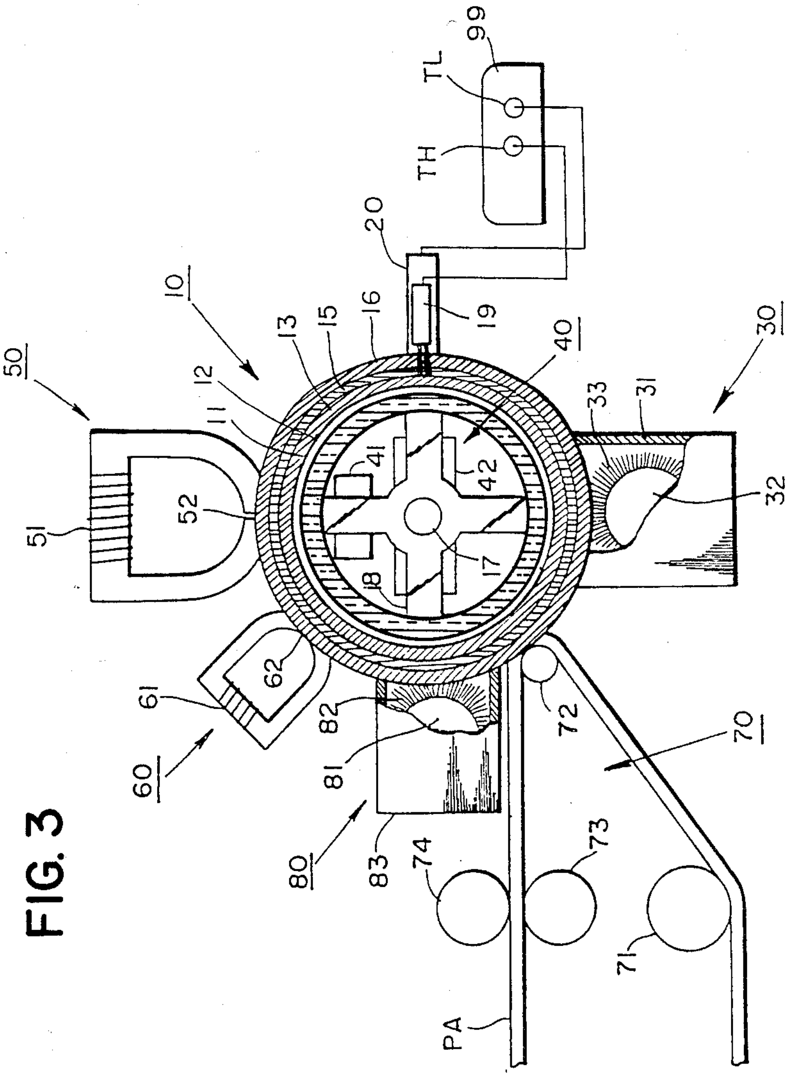
FIG. 3 is a side view partly in section as seen from an arrow III in FIG. 1.

A thermomagnetic printer of the present invention will now be described in more detail with reference to embodiments shown in the accompanying drawings.

In FIGS. 1 to 4, a recording drum 10 has a drum base 11. This drum base 11 is hollow, and is formed of a transparent material such as glass so as to transmit a light from a light image emitting section 40 to be described later from the inside to the outside. Both the inside and outside surfaces of the drum base 11 are precisely polished to perform the preferable light transmittance. A supporting member 18 is secured at one end of the drum base 11 by means of coupling means such as screws (not shown). A shaft 17 is coupled to the supporting member 18 via means such as a key way (not shown). A driving means (not shown) is coupled to the shaft 17, which is rotated in response to the operation of a light image emitting section 40. The other end of the base 11 remains opened for the light image emitting section 40 and for electrical connections, which will be described later.

A transparent electrically conductive layer 12 is coated over the overall outside surface of the drum base 11. The conductive layer 12 is formed by vacuum deposition process, for example, of indium oxide ($In_2O_3$) and tin oxide ($SnO_2$) in a suitable thickness on the base 11 while rotating the drum base 11. In this case, the surface specific resistance of the drum base 11 is approx 50 Ω/□. A transparent electrode which is employed in a field of a solar battery or a liquid crystal device may be employed as the conductive layer 12. The transparency of the layer 12 ensures to preferably transmit the light from the light image emitting section 40 to be described later.

Electrodes 13 of a predetermined width are respectively provided in the vicinities of both ends of the drum base 11 on the electrically conductive layer 12. The electrode 13 is formed, for example, by exposing a part to be coated by means of a predetermined masking means and coating the exposed part by a spray coater with a mixture of polyurethane resin or epoxy resin and carbon black while rotating the base 11 and then heating the coated part at 100° C. for 30 min. to harden the coated mixture. The specific resistance of the electrode 13 is approx. 50 Ω/□. Metallic electrode may also be employed as the electrode 13.

Then, a photoconductive layer 14 of amorphous silicon is provided on the surface of the electrically conductive layer 12 except the electrode 13. The photoconductive layer 14 is formed, for example, by exposing a part to be coated by means of masking means and coating the exposed part by a plasma CVD method with a mixture of silane gas ($SiH_4$) and phosphine gas ($PH_3$) at a ratio of approx. 100 ppm in an atmosphere of plasma formed by electric discharge while rotating the drum base 11. The photoconductive layer 14 has characteristics of $10^7$ Ω·cm of dark resistance and $1\times10^3$ Ω·cm when light of 7000 Å is irradiated in an intensity of 0.6 μJ/cm$^2$. The photoconductive layer 14 may be I type doped with small amount of hydrogen gas ($H_2$) or P type doped with small amount of an element of the Periodic Table Group III. Other materials may be employed if the material does not lose photoconductivity even at the temperature rise due to the energization by electricity.

Further, a magnetic recording layer 15 is provided over the entire surface of the photoconductive layer 14. The magnetic recording layer 15 is formed, for example, by coating the photo conductive layer 14 with heat resistant macromolecular resin (polyarylate) in which a mixture of approx. 30% of chromium dioxide ($CrO_2$) particles and 5 to 30% of carbon black (both by volume) is dispersed. At this time, the surface specific resistance value of the magnetic recording layer 15 may be varied by increasing or decreasing the quantity of the carbon black in the mixture and is set, for example, to $10^3$ to $10^5$ Ω/□.

Similar to the electrodes 13 electrodes 16 are formed in a predetermined width 13 at both ends of the magnetic recording layer 15. To the electrodes 13 and 16 voltages of, for example, 100 and 0 volts are respectively applied from an external power source 99 via two sets of brush terminals 19 and 20.

Then, a magnetic head 50 is provided as means for applying a magnetic field to the magnetic recording layer 15 longitudinally over the drum 10. The head 50 has a coil 51 and a gap 52 in the same manner as an ordinary magnetic head. The gap 52 confronts the magnetic recording layer 15. The head 50 is formed, for example, of Sendust. The chromium dioxide ($CrO_2$) in the layer 15 is magnetized in a saturated state by a magnetic field produced by the gap 52 upon energization of the coil 51.

On the other hand, an erasing head 60 also has a coil 61 and a gap 62 similarly to the head 50, and is formed, for example, of a sintered ferrite.

A cleaning section 80 is provided under the head 60 along the outer periphery of the drum 10. The cleaning section 80 is constructed to dispose a roller 81 having a brush 82 in a predetermined case 83 and has a function of removing unnecessary magnetic toner coated on the layer 15 in the same manner as an ordinarily electronic copying machine.

A transfer section 70 which has roller means 71 to 74 is provided under the cleaning section 80. An image recorded on the magnetic recording layer 15 is transferred onto a receiving paper PA which is fed from an arrow F1 in FIG. 1. The receiving paper PA is further fed to the direction of an arrow F2 and the image is fixed by a fixing section (not shown). The fixing section is constructed similarly to that used in an ordinary electronic copying machine.

A developing section 30 for coating magnetic toner 34 on the layer 15 is provided under the drum 10. The developing section 30 includes a roller 32 having magnetic toner 34 and a brush 33 in a case 31.

Each of the above-described elements in this embodiment are, for example, constructed as follows:

The drum base 11 has 150 mm of outer diameter, 330 mm of length and 3 mm of thickness. The electrically conductive layer 12 has a thickness of 5000 Å. The photoconductive layer 14 has 290 mm of width and 5 μm of thickness. The magnetic recording layer 15 has 290 mm of width and 5 μm of thickness. The electrodes 13 and 16 have 10 mm of width and approx. 30 μm of thickness. There is provided 10 mm of space between the electrode 12 and the photo conductive layer 14. The terminals 19 and 20 are formed by bundling approx. 50 of copper wires of 0.5 mmφ in a length of approx. 30 mm.

The number of turns of the coils 51 of the head 50 is 300, the gap 52 is 10 μm, the width of the track is 260 mm, and the frequency of the applied voltage is 500 to 1 kHz. The number of turns of the coil 61 is 300, the gap 62 is 40 to 60 μm, and the width of the track is 260 mm.

The light image emitting section 40 has an optical system 41 and a light source unit 42 and is secured by appropriate means (not shown) over the longitudinal direction of inside of the drum 10. The light emitted from the section 40 is directed toward the gap 52 of the head 50. The optical system 41 is composed of lens made of refractive index distribution type optical fiber for focusing light from an LED array 42A to be described later on the photoconductive layer 14 to be a spot of a predetermined diameter.

Figure 4:
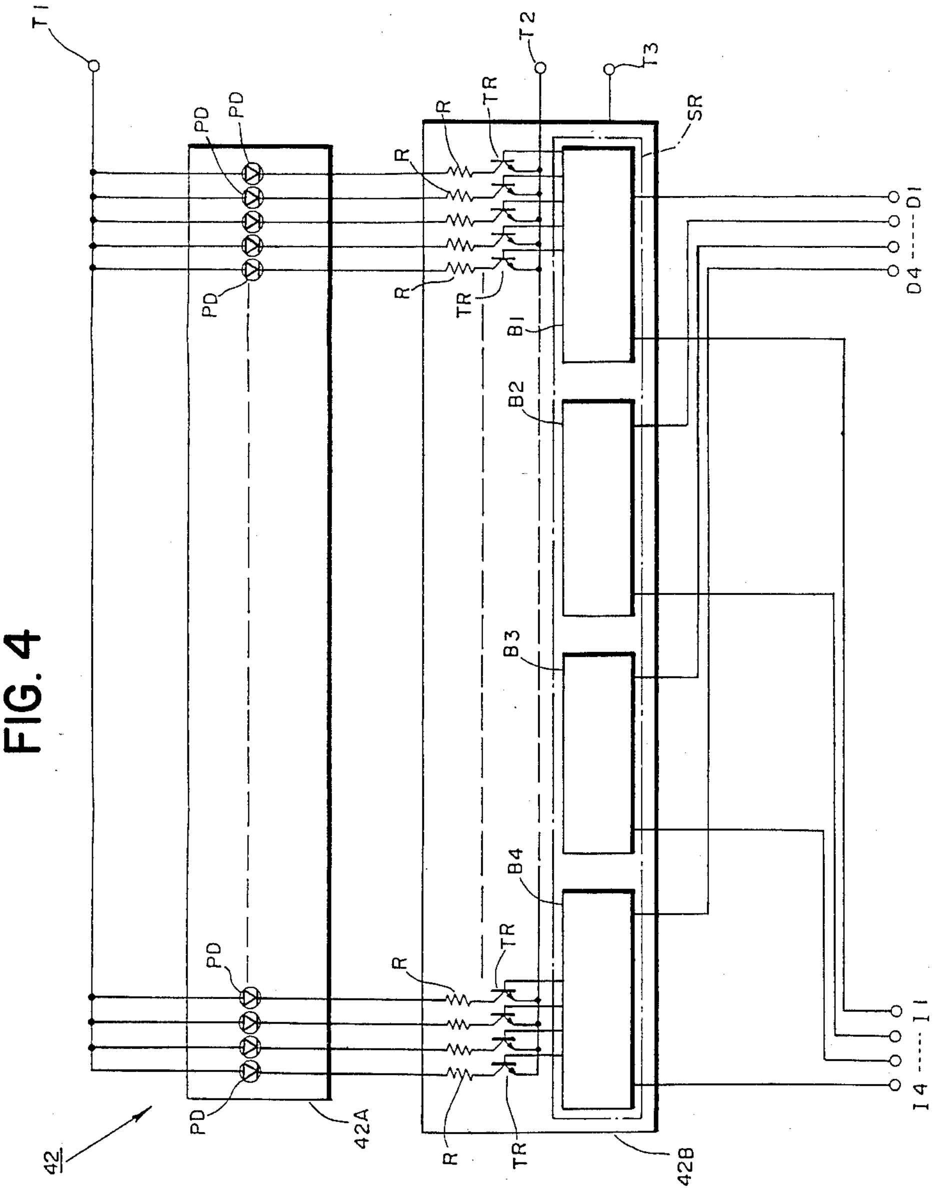
FIG. 4 is a circuit diagram showing an example of a light source unit.

The light source unit 42 has, as shown in FIG. 4, an LED array 42A and a drive unit 42B.

The LED array 42A has a number of light emitting diodes PD arranged longitudinally along the drum 10 in a density of 12 dots/mm. The characteristics of the diode PD emits light of, for example, 7000 Å and 2 mW/cm$^2$ when electric current of 2 mA is applied to the diode. All the anodes of the diodes PD are connected to a terminal T1, and a predetermined bias voltage, for example, 3 volts is applied to the terminal. In this embodiment, the length of the LED array 42A is 256 mm.

All the cathodes of the diodes PD are connected to the drive unit 42B. The drive unit 42B is mounted on the same substrate together with the array 42A, and has a series circuit of resistors R and transistors TR, the number of which corresponds to the number of the diodes PD and a shift register SR for converting data from series to parallel. The diode PD corresponds to one bit of the information representing the presence or absence of the light emission. The collector of the transistor TR is connected through the resistor R to the anode of the diode PD, all the emitter of the transistors TR are connected to the terminal T2, which is maintained at a predetermined voltage such as an earth voltage. The bases of the transistors TR are respectively connected to the shift register SR, thereby forming a drive circuit for one bit. The resistors R, the transistors TR and the shift register SR are simultaneously formed by a bipolar process on a single silicon chip for 64 bits as an integrated circuit. The integrated circuits of necessary number are mounted on the substrate together with the LED array 42A. When the number of the diodes PD is 3072, the number of the integrated circuits is 48, since one integrated circuit has 64 bits.

The integrated circuit has serial input terminals and serial output terminals. Predetermined number of the terminals are connected into one block. The blocks are constructed to perform data input and enable input for each blocks B1 to B4. In case of this embodiment, 12 pieces of the integrated circuits are formed as a block, resulting in $64\times 12=768$ bits. Thus, the entirety is formed in four blocks. Further, a clock pulse is inputted from a terminal T3 to the drive unit 42B. Data terminals D1 to D4 and enable terminals I1 to I4 are provided for each block B1 to B4.

Figure 5:
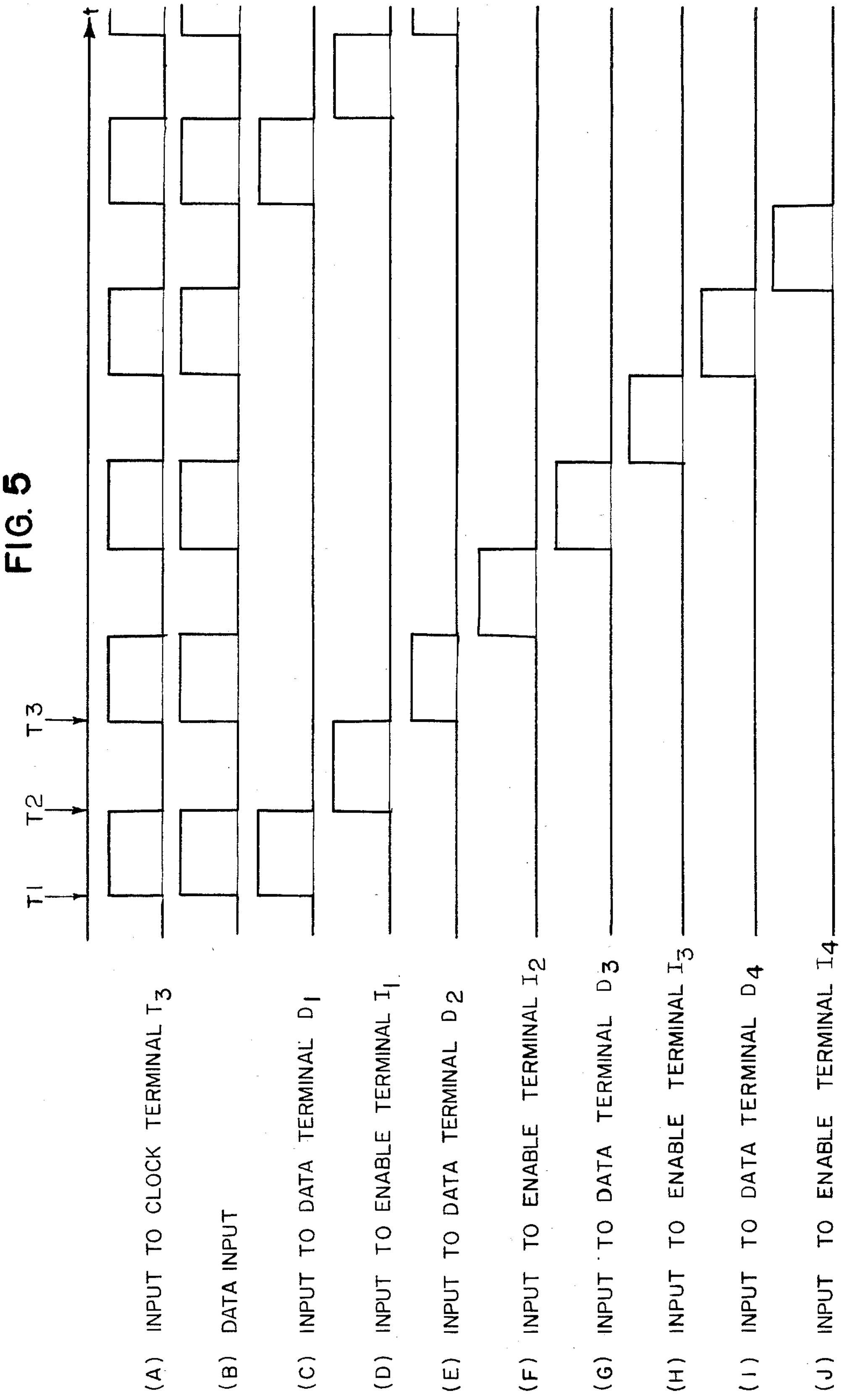
FIG. 5 is a timechart showing the example of an operation of the light source unit in FIG. 4.

Then, the operation of the drive unit 42 will be described while referring to the timechart in FIG. 5. The frequency of the clock pulse is 10 MHz in this embodiment.

When a clock pulse is inputted at time t1 (FIG. 5(A)), the portion of the series data (FIG. 5(B)) between times t1 and t2 is inputted to the block B1 (FIG. 5(C)). This data includes 768 bits. After this input, the input into the enable terminal I1 is performed for a predetermined period of time at time t2. Thus 768 pieces of the diodes DP connected to the block B1 are driven. After time t3, the blocks B2, B3 and B4 are sequentially operated similarly. The clock pulses shown in FIG. 5(A) are not one pulse but a group of pulses necessary for inputting the data simultaneously. The data in FIG. 5(B) are similar to those in FIG. 5(A).

Accordingly, the time required for the light emission for one line becomes as follows:

$$(76.8\times 4)+(100\times 4)=707.2\ \mu\text{sec.}$$

where the inputting times of the enable terminals I1 to I4 are respectively 100 $\mu$sec. When an image is transferred onto a sheet of Japanese Industrial Standards B4 size with dot rows of approximately 3000 lines, it takes approximately 3 sec. The lights emitted from the diodes PD by the above-described operation are passed through the optical system 41, and they are focused on the photoconductive layer 14 of the drum 10.

Figure 6:
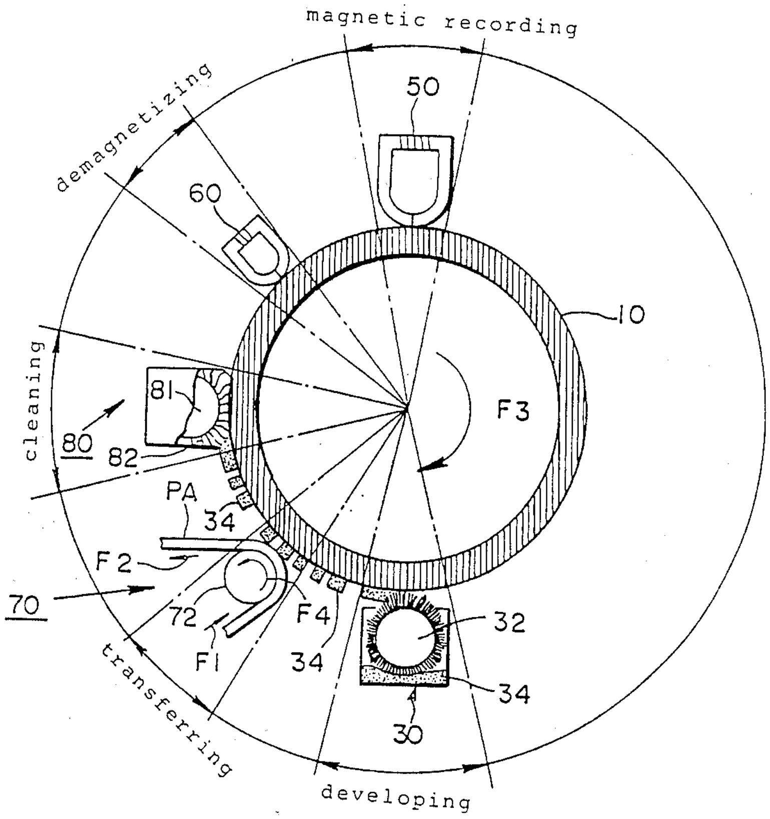
FIG. 6 is an explanatory view showing the sequence of operations of the printer of the invention.
Figure 7:
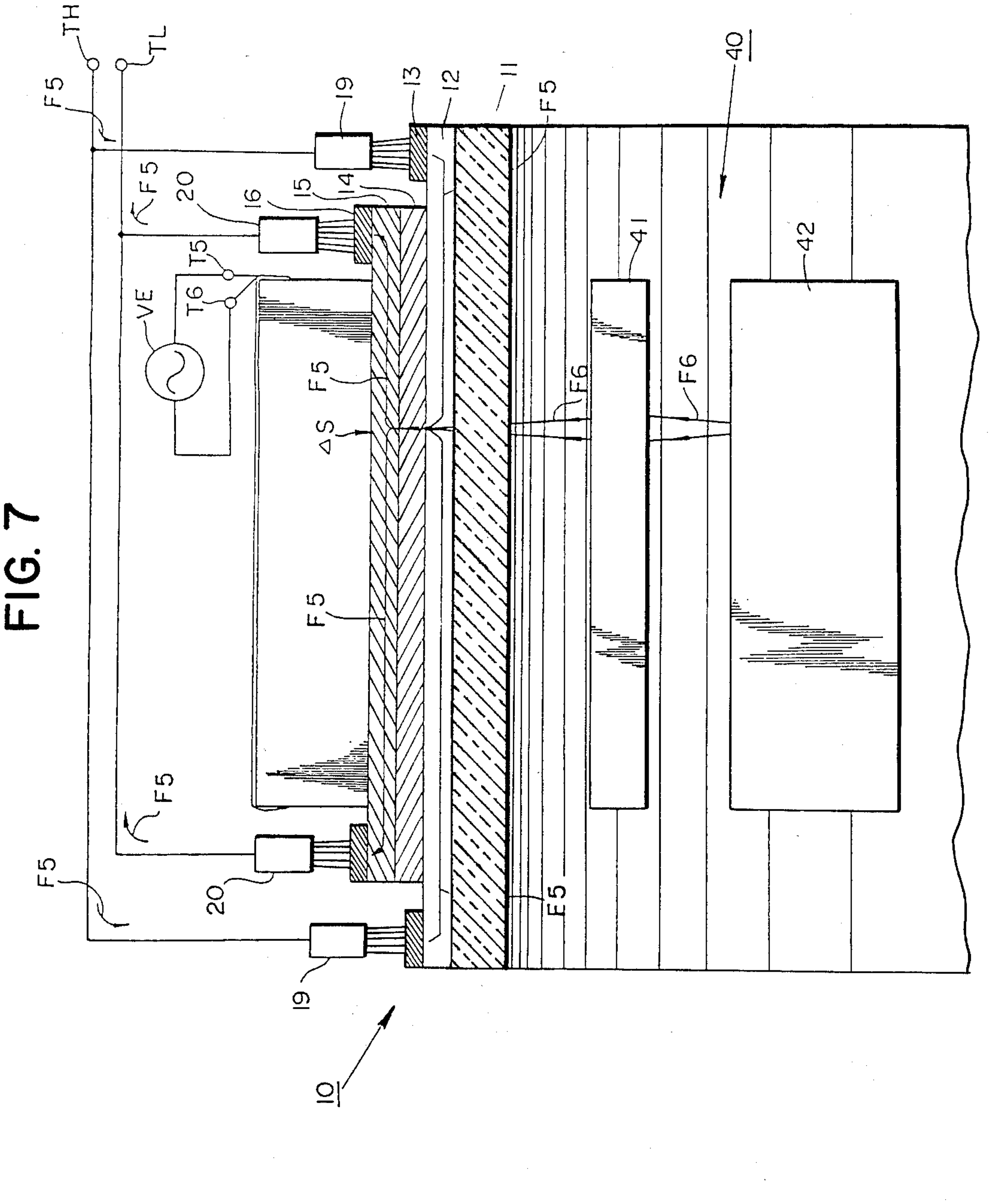
FIG. 7 is an explanatory view showing the current flow in a recording drum.
Figure 8:
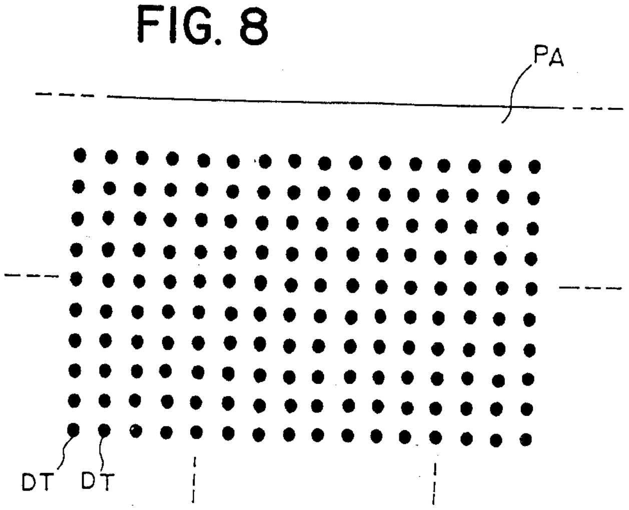
FIGS. 8 and 9 are explanatory views showing examples of transferred image on a receiving paper.
Figure 9:
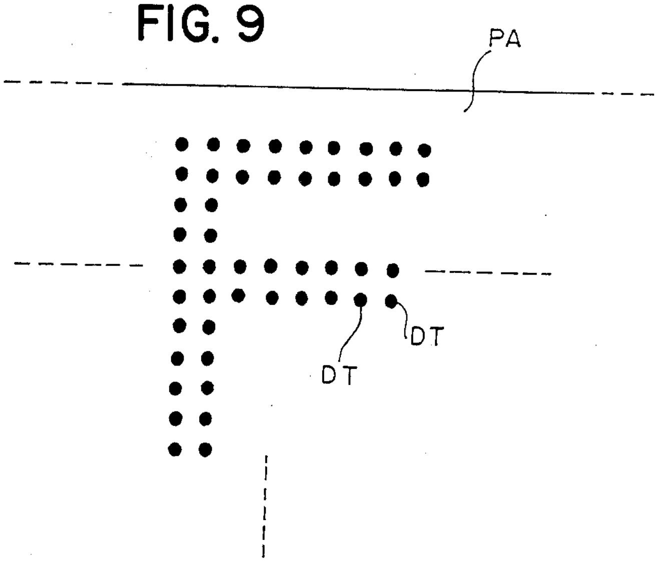

Then, the operation of the printer will be described with reference to FIGS. 6 to 9 in addition to FIGS. 1 to 5. FIG. 6 shows the sequence of operations from the formation of a magnetic latent image to the transfer and demagnetization. FIG. 7 shows the state of a current flowing through the drum 10. FIG. 8 shows the state of the receiving paper PA when the diodes PD emit lights. FIG. 9 shows the state of the receiving paper PA when a character "F" is printed by the data input.

As shown in FIG. 6, when the drum 10 rotates in a direction of an arrow F3, the magnetic recording layer 15 fully demagnetized by the head 60 arrives at the position of receiving a light from the light image emitting section 40. Before the light emission the synthetic resistance of the layers 15 and 14 is high and an electric current flowing from the terminal TH to the terminal TL is extremely small, resulting in small heating by Joule heat effect (FIG. 7). In this state, when light is emitted from the section 40 as an arrow F6 in FIG. 7, the light arrives at the photoconductive layer 14 through the drum base 11 and the electrically conductive layer 12. Thus, the irradiated part of the layer 14 becomes conductive, and a current flows in the direction as shown by an arrow F5 in FIG. 7. Thus, the current flowing from the terminal TH flows through the terminal 19 and the electrode 13 into the electrically conductive layer 12, and passes through the irradiated part of the photoconductive layer 14 to the magnetic recording layer 15, and further arrives through the electrode 16 and the terminal 20 to the terminal TL.

When the current flows as described above, most of the current is concentrated at the part $\Delta S$ of the layer 15 which is disposed above the irradiated part of the photoconductive layer 14, resulting in an increase in the current density, whereby heating occurs by the Joule heat effect.

A magnetic field is continuously applied by the head 50 to the heated part of the magnetic recording layer 15, thereby selectively magnetizing the heated part by the thermomagnetic effect. In other words, the part of the layer 15 corresponding to the irradiated part is magnetized by this thermoremanent magnetization effect. Accordingly, the light emitted based on image information forms the magnetized pattern corresponding to the image and hence the magnetic latent image is stored on the magnetic recording layer 15.

After the latent image is formed by the above operation, the magnetic recording layer 15 in which the latent image is stored is moved to the developing section 30 when the drum 10 is rotated in the direction of the arrow F3 in FIG. 6. In the developing section 30, the toner 34 is coated by the roller 32 on the latent image, thereby performing the development of the image.

When the drum 10 is further rotated in the direction of the arrow F3, the developed image is transferred to the receiving paper PA by the roller means 72 of the transfer section 70, and the transferred image is fixed on the receiving paper PA in the fixing section (not shown).

Further, the unnecessary toner 30 remaining on the magnetic recording layer 15 is removed in the cleaning section 80, and the latent image is demagnetized by the head 60 for the next magnetic recording.

In the case that the same image is to be printed repeatedly, only the developing section 30 and the transfer section 70 are operated after the latent image is once formed, and the image is repeatedly printed.

When the above operation is performed for all the light emitting diodes PD shown in FIG. 4, rows of dots DT shown in FIG. 8 are printed on the receiving paper PA.

As described above, any character such as shown in FIG. 9 may be expressed and reproduced in combination of dots DT on the receiving paper PA without scanning the head 50 by controlling the emitting operation of the diodes PD based on image information in the light image emitting section 40. In a trial printer according to the embodiment, dots DT were preferably separated in a density of 12 dots/mm and an image of very clear and high quality could be reproduced with almost no contamination in background and without irregular density nor dropout of dots. No deformation nor modification of the drum 10 were observed. Even if the drum 10 is supported at the one end by the shaft 17 and the member 18 as a cantilever support, no problem occurred. The temperature of the heated section of the magnetic recording layer 15 in the trial printer was approx. 200° C. as measured by an infrared ray microscope model RM-2A made by Barnes Co.

In the embodiment described above, the photo conductive layer 14 is formed of amorphous silicon since amorphous silicon has excellent heat resistance property. However, other materials such as ZnO may be employed. The materials of other members may not be limited only to those described above, but other materials may also be employed.

The magnetic recording layer 15 may be formed of other materials if the materials are ferromagnetic material having relatively low Curie temperature and sufficient heat resistance when being heated by Joule heat. For example, Tb-Fe series, Gd-Co series may be employed. For the head 50 a magnetic roll may be employed on which a predetermined magnetizing pattern is formed on the periphery. The optical system 41 emitting means employs the lens and the LED array 42A. However, the system 41 may employ other transmission type liquid crystal array, magnetic bubble array, magneto-optical element or semiconductor laser. When this printer is applied to a copier, it should be so designed that the reflected light from a manuscript is led through a lens or a mirror.

In the embodiment described above, the drive circuits of the LED array 42A are divided into a predetermined number of blocks. However, other drive means may also be employed. For example, data inputs are conducted over the entirety in parallel, and the LED arrays 42A will be simultaneously driven. Further, a memory circuit such as a latch circuit may be connected between the shift register SR and the transistors TR in the drive circuit, thereby simultaneously performing both the data input and output in parallel, thereby shortening the processing time to reproduce the image.

Figure 10:
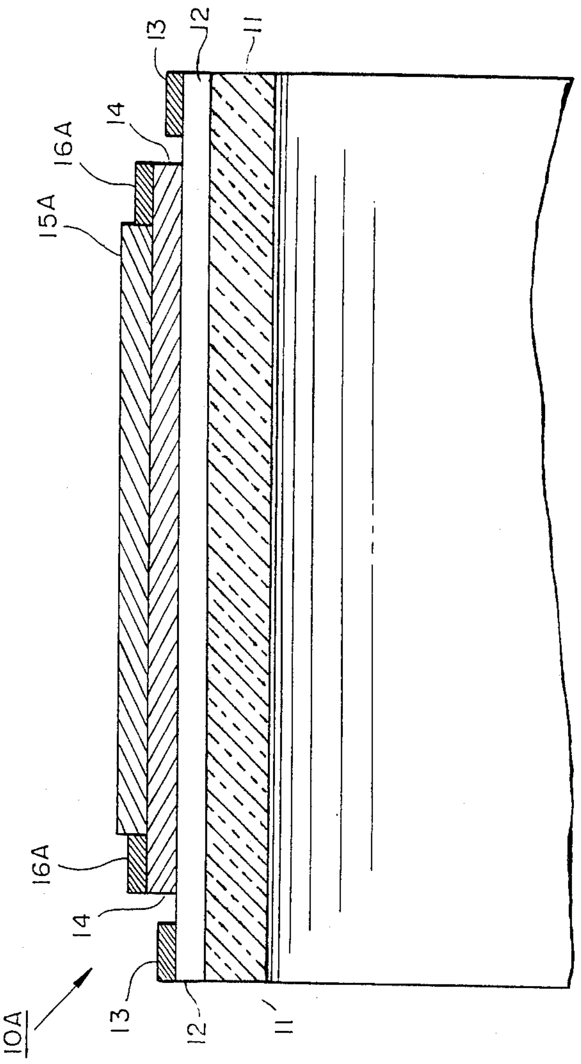
FIG. 10 is an explanatory view showing another embodiment of the invention.

Further, the electrodes 16 are formed on the layer 15 in this embodiment. However, as shown in FIG. 10, the electrodes 16A may be formed via magnetic recording layer 15A on the photoconductive layer 14. In a trial printer thus constructed, the similar preferable effect could also be obtained.

What is claimed is:

1. A thermomagnetic printer comprising:

a cylindrical recording drum rotating in a fixed direction, said recording drum including a transparent cylindrical base member, said base member being provided with a transparent electrically conductive layer on the surface thereof, said electrically conductive layer being provided with a photoconductive layer on the surface thereof, said photoconductive layer being provided with a magnetic recording layer of low Curie temperature on the surface thereof, first and second electrodes connected to said electrically conductive layer and said magnetic recording layer, respectively, said first and second electrodes being provided at an end portion of said recording drum, electric power supplying means for applying electricity between said electrically conductive layer and said magnetic recording layer through said first and second electrodes, magnetic field applying means fixedly disposed at the vicinity of said magnetic recording layer, for applying a magnetic field to said magnetic recording layer, light emitting means, fixedly disposed inside said transparent base member and operative as said recording drum rotates, for irradiating light representing an image to be reproduced, through said transparent base member and said transparent electrically conductive layer, onto portions of said photoconductive layer adjacent to portions of said magnetic recording layer to which said magnetic field is applied, developing means for performing development of a magnetic latent image formed by the magnetization effect on portions of said magnetic recording layer to which said magnetic field is applied, said portions being selectively heated beyond the Curie point by said applying of electricity from said electric power supplying means and by said irradiation of light by means of said emitting means, said selectively irradiated portions becoming magnetized as they rotate away from the location of light irradiation within said magnetic field, said developement being performed by coating magnetic toner to said magnetized portions as said recording drum rotates, and transferring means for transferring the developed image onto a paper.

2. A thermomagnetic printer as claimed in claim 1 further comprising:

cleaning means for removing remaining magnetic toner from the surface of said magnetic recording layer after said transferring is performed, and demagnetizing means for demagnetizing said magnetic recording layer after removing the remaining magnetic toner.

3. A thermomagnetic printer as claimed in claim 1 wherein said light emitting means includes an LED array which emits light corresponding to the image to be reproduced and an optical system for focusing the light emitted from said LED array on said photoconductive layer as a spot of a desired diameter.

4. A thermomagnetic printer as claimed in claim 3 wherein said optical system is a condensing optical system.

5. A thermomagnetic printer as claimed in claim 1 wherein said electrically conductive layer is formed of indium tin oxide (ITO).

6. A thermomagnetic printer as claimed in claim 1 wherein said photoconductive layer is formed of amorphous silicon.

7. A thermomagnetic printer as claimed in claim 1 wherein said magnetic recording layer is formed of a heat resistant macromolecular resin in which approximately 30% of chromium dioxide ($CrO_2$) particles and 5 to 30% of carbon black respectively by volume are dispersedly contained.

8. A thermomagnetic printer as claimed in claim 7 wherein said magnetic recording layer has surface specific resistance value of $10^3$ to $10^5$ Ω/□.

* * * * *